J. RIVERS.
SYSTEM OF BOAT PROPULSION.
APPLICATION FILED FEB. 8, 1908
921,891.
Patented May 18, 1909.
4 SHEETS—SHEET 1.
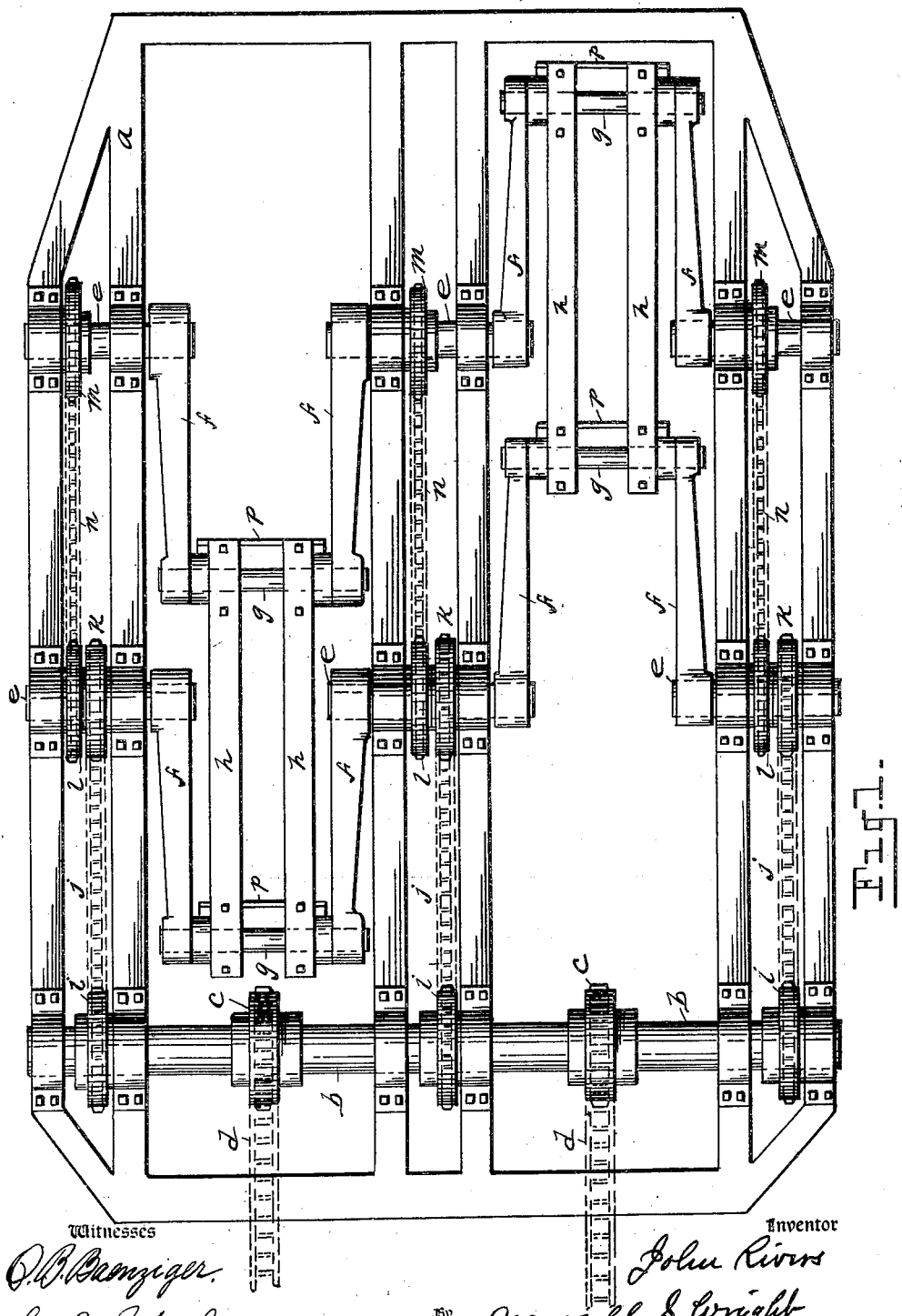

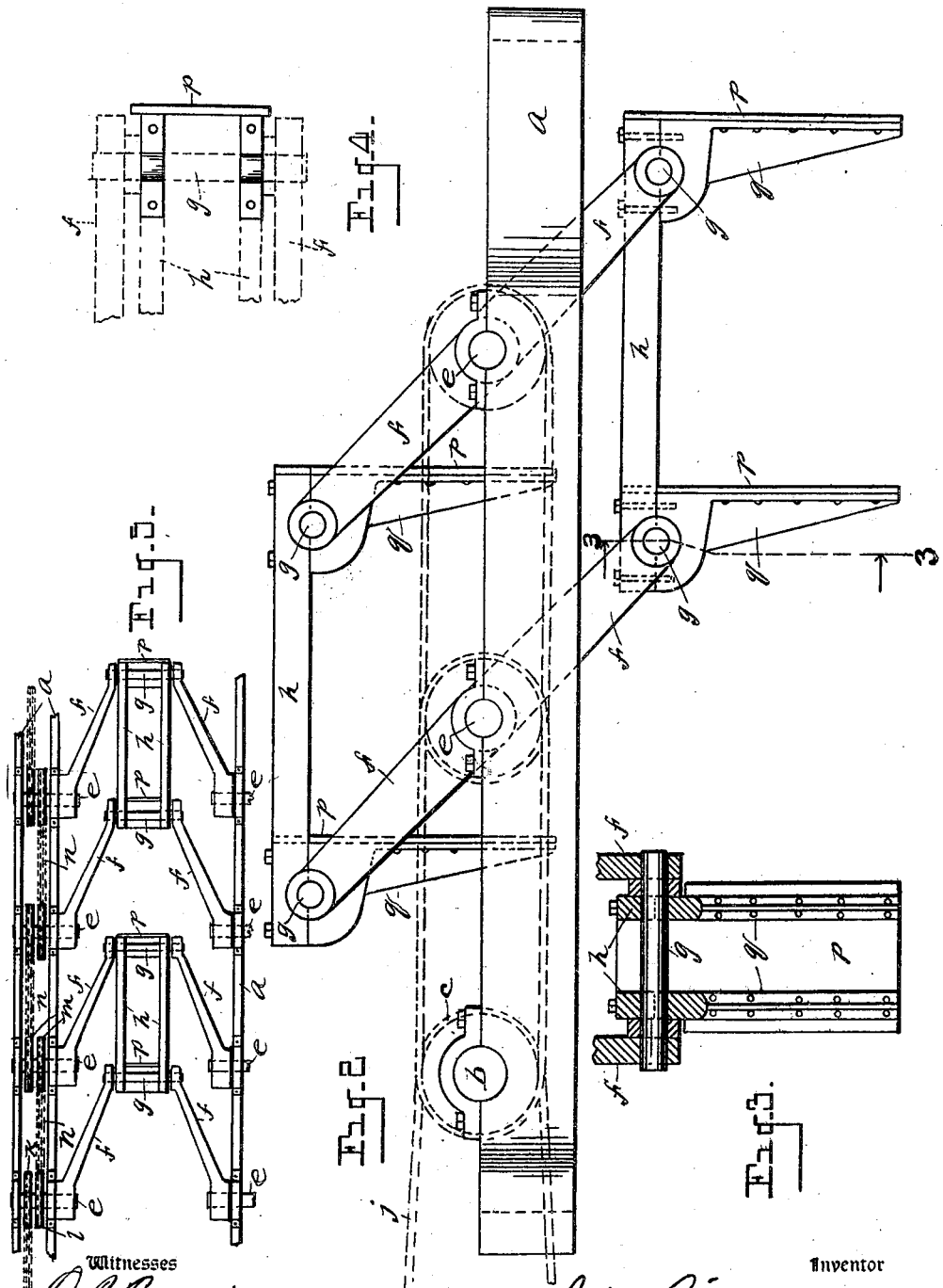

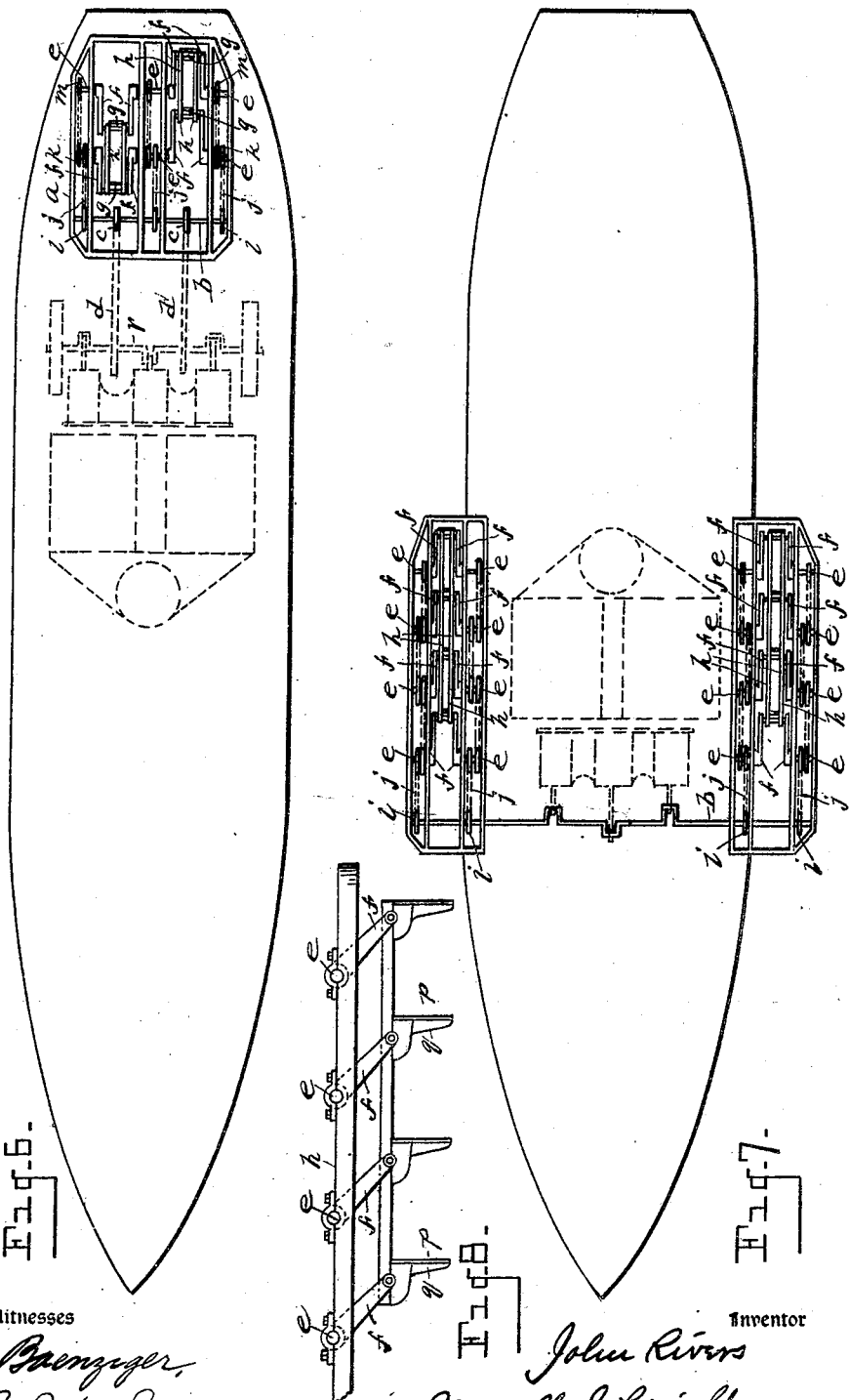

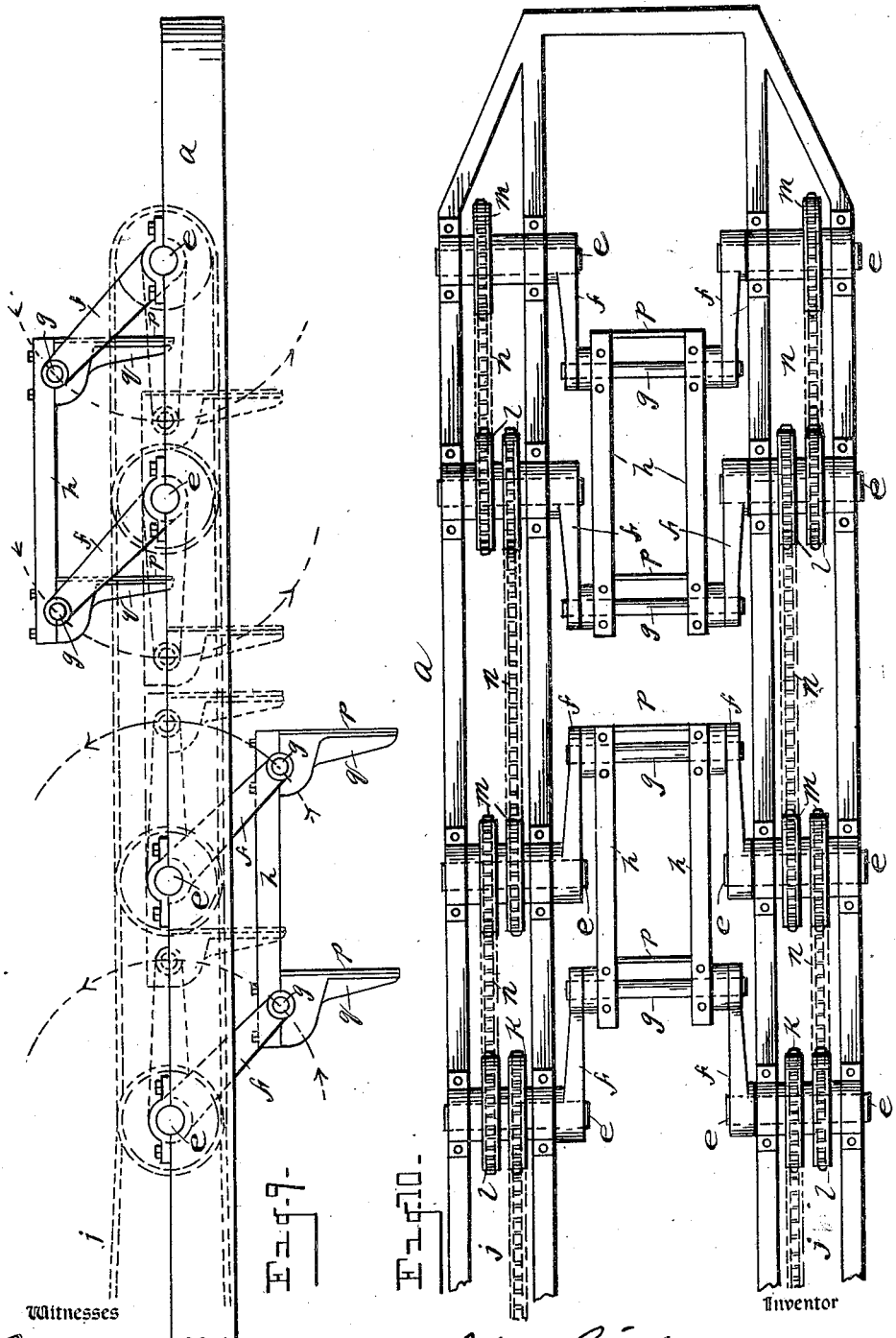

UNITED STATES PATENT OFFICE.

JOHN RIVERS, OF DETROIT, MICHIGAN.

SYSTEM OF BOAT PROPULSION.

No. 921,891.     Specification of Letters Patent.     Patented May 18, 1909.

Application filed February 8, 1908. Serial No. 414,863.

*To all whom it may concern:*

Be it known that I, JOHN RIVERS, a subject of the Czar of Russia, but who has declared his intention to become a citizen of the United States, residing at Detroit, in the county of Wayne and State of Michigan, have invented certain new and useful Improvements in Systems of Boat Propulsion, of which the following is a specification.

My invention has for its object novel means for boat propulsion, of superior efficiency and utility and it consists of the construction, combination and arrangements of devices hereinafter described and claimed and illustrated in the accompanying drawings, in which—

Figure 1. is a plan view. Fig. 2. is a view in side elevation. Fig. 3. is a view in section on the line 3—3 Fig. 2. Fig. 4. is a detail view in plan of one of the paddles, adjacent parts being shown in dotted lines. Fig. 5. is a plan view of a part of the mechanism showing a modification. Fig. 6. is a plan view showing the mechanism applied to a vessel propelled from the rear. Fig. 7. is a plan view showing the mechanism applied to a side propelled vessel. Fig. 8. is a side elevation of one of the mechanisms shown on Fig. 7. Fig. 9 is a side elevation of portions of the device showing a modified form of arranging certain parts. Fig. 10. is a plan view of the mechanism shown in Fig. 9.

In carrying out my invention, as illustrated in the drawings submitted herewith, $a$ represents any suitable support or frame, a main driving shaft to drive the propelling mechanism being indicated at $b$ which may be journaled in said support or otherwise. This driving shaft may be actuated by any suitable means. As shown said shaft is provided with sprocket wheels $c$ upon which are engaged sprocket chains $d$ to be geared with the engine shaft $r$. The shaft $b$ may however be actuated by any desired mechanism, or, for boats of light construction it might be propelled by hand, within the scope of my invention.

Journaled upon the frame $a$ are shown multiple paddle actuating shafts $e$ arranged in pairs, with each of which is engaged a corresponding crank arm $f$, companion crank arms at their opposite ends being united by corresponding connecting shafts $g$. Said paddle actuating shafts, with their corresponding crank arms, are preferably arranged in series, two series being located side by side although I do not limit myself solely to such arrangements. The shaft $g$ of one set of crank arms $f$ is connected with a corresponding shaft $g$ of another set of crank arms by means of a pair of connecting bars $h$, in the extremities of which the opposite ends of the corresponding shafts $g$ are journaled.

I have shown plural sets of crank arms $f$ connected as above described in one series, the adjacent series of crank arms being similarly arranged with the exception that in the two series the crank arms project in opposite directions. The shafts $e$ are driven from the shaft $b$ by any suitable means. Thus the driving shaft $b$ is shown provided with sprocket wheels $i$ connected by sprocket chains $j$ with the adjacent shaft $e$. The shafts $e$ adjacent to the driving shaft being provided with sprocket wheels $k$ connected by corresponding chains $j$. The adjacent shafts $e$ are also provided with sprocket wheels $l$ and $m$ connected by a chain $n$. The shafts $e$ may however, within the scope of my invention, be driven from the shaft $b$ in any suitable manner. Secured upon the opposite extremities of the connecting shafts $g$ are downwardly projecting paddles $p$. It will readily be seen, since the crank arms $f$ project in opposite directions in the two series, that the paddles of one series will be in a downward and active position, while the paddles of the other series are elevated to inoperative position, one series of paddles thus being constantly in the water, the paddles of one series being elevated as the paddles of the other series are forced downward. The paddles are preferably provided with vertically extending brace arms $q$ which at their upper ends may form a portion of the respective bearings for the corresponding shafts $g$, the bearings being located near the opposite sides of the paddles, the shafts $g$ being of sufficient length to enable the paddles to be mounted thereupon, on the opposite sides thereof, to afford a firm engagement of the paddles with the shaft, as shown. The adjacent crank arms of the two series are spaced thus apart sufficiently to admit the paddles being engaged upon the connecting shafts therebetween at both extremities of the shaft.

I do not limit myself to any number of paddles and mechanisms for operating the same, certain of the drawings showing two paddles in each series, while in other drawings I have shown four paddles in a single series. Nor do I limit myself to having the two series of paddles arranged side by side in as much as they may be arranged in a single longitudinal series. Neither do I limit myself to having the paddles of one series arranged to be elevated at the same time that the paddles of the other series are depressed.

In Figs. 7 and 8 I have shown four paddles all arranged to be elevated or depressed simultaneously. In a side propelled vessel the latter form is preferable in order that the propelling mechanism may not extend too far laterally. In a stern propelled vessel however, as shown in Fig. 6 I prefer to arrange the two series side by side.

In Fig. 5 the two sets of paddles work together in their elevation and depression. The mechanism shown as arranged in Fig. 5 takes up the least room, the crank arms converging in order that the forward ends of one set of crank arms may project between the opposite ends of the adjacent set.

In Fig. 10 additional shafts e with their attachments are shown, the one driven with the other in the manner above described, but in which one set is elevated while the other set is depressed.

In Fig. 7 the shaft b is shown connected directly with the engine piston rods.

What I claim as my invention is:

1. A system of boat propulsion comprising plural sets of rotatable paddle actuating shafts, a pair of crank arms carried by each set of shafts, a connecting shaft with which the ends of the companion crank arms are engaged, and paddles mounted upon the connecting shafts toward opposite ends of said shafts, respectively, said paddles arranged to have a vertical movement as the crank arms are rotated.

2. A system of boat propulsion comprising plural sets of rotatable paddle actuating shafts, each set of shafts having a pair of crank arms, connecting shafts connecting the ends of the corresponding crank arms, paddles carried by bearings mounted upon each of said connecting shafts toward opposite ends of said shafts, respectively, and a pair of connecting bars connecting the shafts of each pair of crank arms whereby a given pair of crank arms will work in unison, said paddles and the adjacent extremities of the corresponding connecting bars forming said bearings.

3. A system of boat propulsion comprising plural sets of rotatable paddle actuating shafts, each set of shafts having a pair of crank arms, connecting shafts connecting the ends of corresponding crank arms, paddles carried by bearings mounted upon each of said connecting shafts toward opposite ends of said shafts, respectively, and a pair of connecting bars connecting the shafts of each pair of crank arms and mounted toward opposite ends of the connecting shafts, whereby a given pair of crank arms will work in unison, said paddles and the adjacent extremities of the corresponding connecting bars forming said bearings.

4. A system of boat propulsion comprising plural sets of rotatable paddle actuating shafts, each set having a pair of crank arms, connecting shafts connecting the ends of corresponding crank arms, paddles mounted upon said connecting shafts toward the opposite ends of said shafts, respectively, and a pair of connecting bars connecting the shafts of each pair of crank arms mounted toward opposite ends of the connecting shafts, whereby a given pair of crank arms will work in unison, each paddle forming at opposite sides thereof, one portion of its bearings upon said shaft, and the adjacent ends of the connecting shafts forming the other portion of said bearings.

5. A system of boat propulsion comprising a supporting frame, a driving shaft mounted upon said frame, plural sets of paddle actuating shafts mounted upon said frame and driven from the driving shaft, crank arms connected with each set of paddle actuating shafts, a connecting shaft connecting the extremities of each set of crank arms, paddles mounted upon each of the connecting shafts toward opposite ends of said shafts, respectively, and therebetween, and connecting bars having their extremities mounted upon the connecting shafts of two companion sets of paddle actuating shafts toward opposite ends of said shafts.

In testimony whereof I have signed this specification in presence of two witnesses.

JOHN RIVERS.

Witnesses:
N. S. WRIGHT,
G. E. McGRANN.